May 12, 1964     H. KEHL     3,132,632
ROTARY ENGINE
Filed June 12, 1961     3 Sheets-Sheet 1
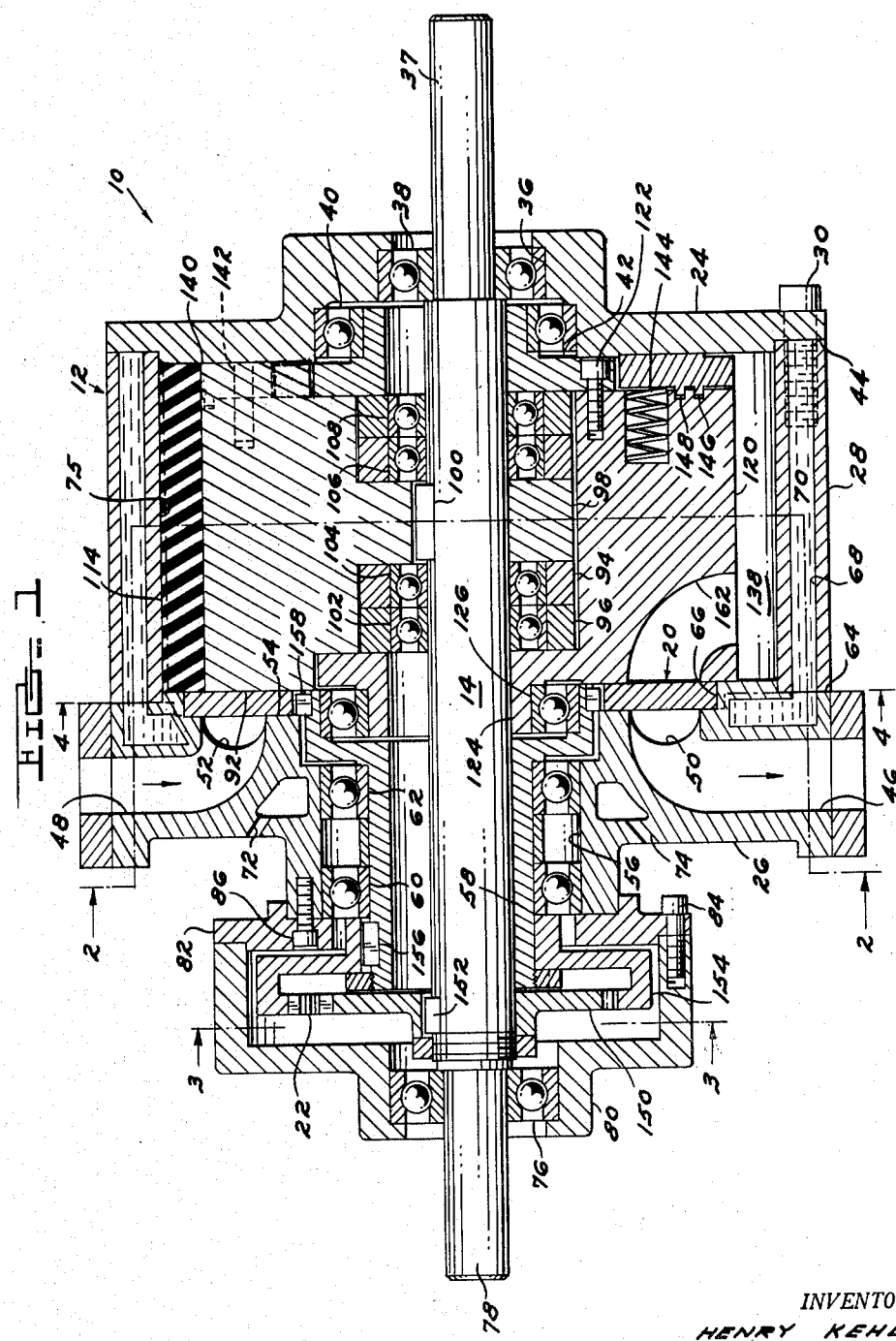
INVENTOR.
HENRY KEHL
BY *Whittemore,*
*Hulbert & Belknap*
ATTORNEYS May 12, 1964
H. KEHL
3,132,632
ROTARY ENGINE
Filed June 12, 1961
3 Sheets-Sheet 2
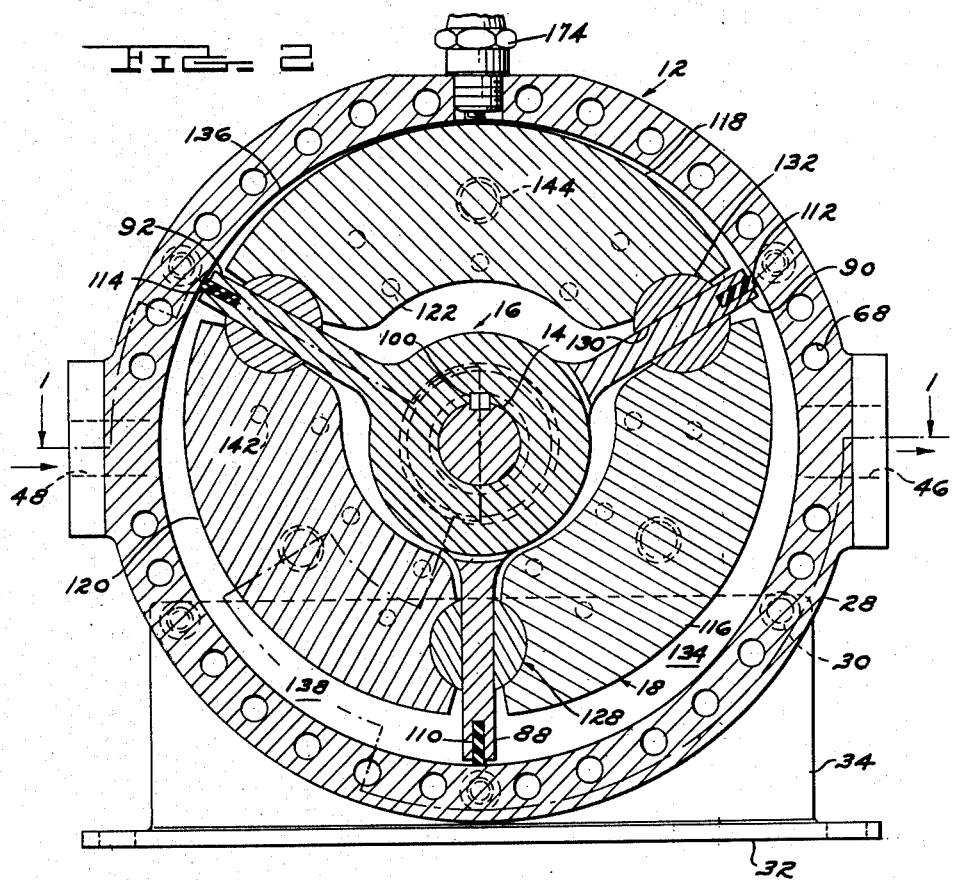
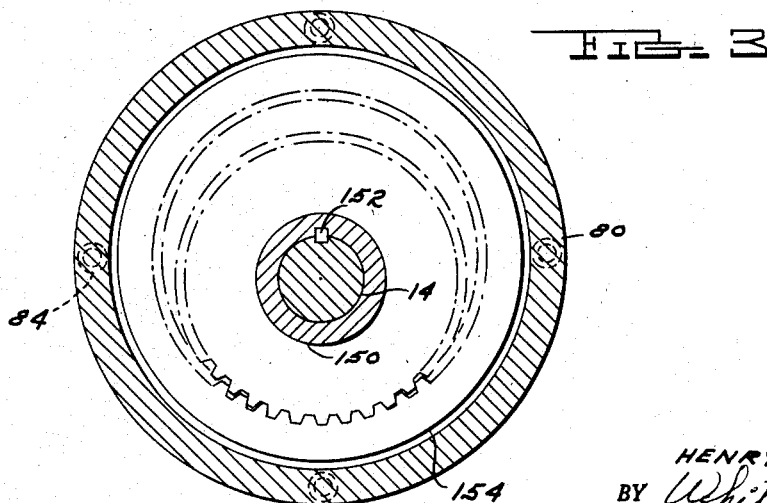
INVENTOR.
HENRY KEHL
BY *Whittemore*
*Hulbert & Belknap*
ATTORNEYS May 12, 1964  H. KEHL  3,132,632
ROTARY ENGINE
Filed June 12, 1961  3 Sheets-Sheet 3
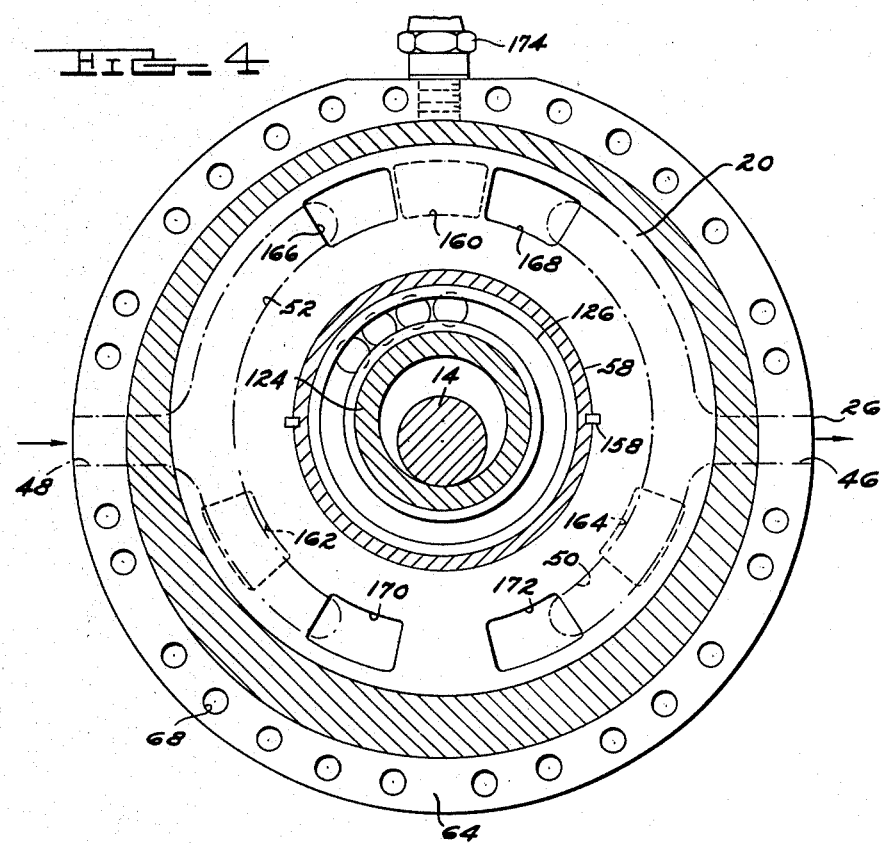
INVENTOR.
HENRY KEHL
BY Whittemore
Hulbert & Belknap
ATTORNEYS United States Patent Office 3,132,632
Patented May 12, 1964

3,132,632
ROTARY ENGINE
Henry Kehl, 3283 Byng Road, Windsor, Ontario, Canada
Filed June 12, 1961, Ser. No. 116,383
4 Claims. (Cl. 123—16)

The invention relates to engines and refers more specifically to a rotary internal combustion engine.

Internal combustion engines of the reciprocating piston type wherein a reciprocal linear motion is transferred into continuous rotary motion of a shaft in a selected direction for use are inherently inefficient in that the pistons must come to a dead stop at each end of their travel. Much energy is thus required merely to stop the pistons in each limiting position and to start them moving in the opposite direction. For some time it has been recognized that a rotary motor in which rotary motion is imparted to a shaft directly on combustion of fuel would be desirable.

Rotary engines of the past have however in general been relatively complicated and inefficient due to the difficulty of providing an operable structure in which the periodic expansion of gases due to ignition thereof after compression will produce continuous rotation of a shaft in a selected direction.

It is therefore one of the objects of the present invention to provide an improved rotary internal combustion engine.

Another object is to provide a rotary engine including a cylindrical housing, vanes mounted for rotation on a shaft extending axially through the cylindrical housing and concentric with the inner surface thereof and a rotor within the housing in driving relation to the vanes and mounted eccentrically with respect to the vanes and the inner surface of the cylindrical housing.

Another object is to provide a rotary internal combustion engine comprising a cylindrical housing, a shaft extending through said housing coaxial therewith, vanes mounted on the shaft concentric with the inner surface of the cylindrical housing, a cylindrical rotor sleeved over the shaft and mounted eccentrically with respect thereto and the inner surface of the cylindrical housing, means for sealing the spaces provided between the vanes, rotor and cylindrical housing to provide a plurality of individual combustion chambers of variable volume around the circumference of the rotor, means for drawing fuel into the combustion chambers, means for compressing the fuel in the combustion chambers, means for subsequently igniting the compressed fuel in the combustion chambers, and means for exhausting the exhaust gases in the combustion chambers in sequence at different times in the cycle of the engine, and means for controlling the cycle of the engine.

Another object is to provide a rotary engine as set forth above wherein the vanes are relatively angularly movable.

Another object is to provide an internal combustion engine as set forth above wherein one of the vanes is in driving engagement with the shaft.

Another object is to provide a rotary engine as set forth above wherein the means for controlling the cycle of the engine includes a valve plate having openings therethrough selectively registrable with exhaust and inlet passages in the cylindrical housing and with openings in the rotor to the combustion chambers, and means for rotating the valve plate at a speed different from the speed of rotation of the rotor.

Another object is to provide a rotary engine as set forth above wherein the openings in the valve plate, rotor and cylindrical housing are constructed and arranged to provide three explosions for two rotations of the rotor.

Another object is to provide a rotary engine as set forth above wherein the relatively outer ends of the vanes are not in bearing contact with the inner walls of the cylindrical housing and relatively light sealing inserts are provided in the radially outer ends of the vanes for effecting a seal between the inner wall of the cylindrical housing member and the outer ends of the vanes.

Another object is to provide a rotary engine which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is a longitudinal section through the rotary engine of the invention taken substantially on the line 1—1 in FIGURE 2.

FIGURE 2 is a cross section of the rotary engine of FIGURE 1 taken substantially on the line 2—2 in FIGURE 1.

FIGURE 3 is a cross section of the rotary engine of FIGURE 1 taken substantially on the line 3—3 in FIGURE 1.

FIGURE 4 is a cross section of the rotary engine of FIGURE 1 taken substantially on the line 4—4 in FIGURE 1 and having the fuel intake and exhaust passages superimposed thereon in dashed line.

With reference to the figures of the drawings one embodiment of the present invention will now be disclosed.

The rotary engine 10 comprises the generally cylindrical motor housing 12 having the shaft 14 mounted for rotation concentrically therewith. The vane means 16 are provided on the shaft 14 and are concentric with shaft 14 and housing 12 while the rotor means 18 is mounted within the housing 12 eccentric with respect to the axis of the housing, shaft and vanes. Valve plate 20 is also mounted in the housing 12 and is rotated at a speed different from that of the rotor 18, vanes 16 and shaft 14 by drive means 22.

Engine 10 in operation is a four cycle engine wherein during two full rotations of the rotor means 18 fuel is drawn into each combustion chamber formed between the ends of vanes 16, housing 12, rotor 18 and sealing means to be considered in detail later, after which it is compressed. The compressed fuel is then ignited to rotatably drive the rotationally balanced vane means 16 and rotor means 18 after which the combustion gases are exhausted from the separate chambers. The cycle of each combustion chamber is timed to provide three equally spaced fuel explosions for each two complete revolutions of rotor means 18.

More specifically the motor housing 12 includes the end plates 24 and 26 secured to the cylindrical member 28 by convenient means, such as bolts 30. The end plates and cylindrical member are supported by means of the base 32 illustrated in FIGURE 2 and brackets 34 secured to the base by convenient means, such as welding.

End plate 24 is provided with a stepped opening 36 therein through which the shaft 14 extends, as shown best in FIGURE 1. End 37 of shaft 14 is rotatably mounted in bearings 38 secured in the opening 36. Similar bearings 40 having a larger diameter are also secured in the stepped opening 36 to rotatably mount the collar 42 which will be considered in more detail later. Additionally an annular recess 44 is provided at the radially outer edge of the end plate 24 on the inner side thereof for receiving one end of the cylindrical member 28.

End plate 26, as shown best in FIGURE 1, is thicker than end plate 24 and is provided with an exhaust passage 46 and an intake passage 48 at opposite sides thereof extending radially thereinto and including circumferentially extending portions 50 and 52, respectively, on the inner surface 54 thereof. End plate 26 also has a stepped opening 56 therein through which the end 78 of shaft 14 extends. A valve plate adapter sleeve 58 which will be discussed in more detail later is rotatably mounted in opening 56 by means of bearings 60 and 62. The recess 64 on the inner surface of the end plate 26 is provided at the radially outer edge thereof to receive the other end of the cylindrical member 28. An additional annular recess 66 is provided in the inner face of the end plate 26 in which the valve plate 20 is rotatably mounted as will be considered in more detail subsequently.

The cylindrical member 28 of the motor housing 12 is secured to the end plates 24 in the recesses 44 and 64 as previously indicated and is provided with cooling channels 68 therethrough in the known manner for circulation of a coolant 70, as will be understood by those in the art. Additionally the coolant may be circulated through the end plate 26 as desired, as shown in FIGURE 1, and suitable inlet and outlets for the coolant indicated at 72 and 74 may be provided.

The shaft 14 which is mounted for rotation in bearing 38 at end 37 is concentric with the inner surface 75 of cylindrical member 28 and is mounted in bearing 76 at the other end 78 thereof. Bearing 76 is supported in gear housing 80 which is secured to collar 82 supported on the end plate 26. Suitable connections between the end plate 26, collar 82 and gear housing 80, such as bolts 84 and 86, are provided.

Vane means 16 includes the separate vanes 88, 90 and 92 mounted on the shaft 14. Vanes 88 and 90 are rotatably mounted on the shaft 14 by means of spaced apart circular radially inner end portions 94 and 96, respectively. The vane 92 is however secured to the shaft 14 for rotation therewith by means of a cylindrical radially inner end portion 98 secured to the shaft 14 by convenient means such as key 100. Bearings 102, 104, 106 and 108 are provided to insure the rotatable mounting of the vanes 88 and 90 on the shaft 14.

Vanes 88, 90 and 92 are concentric with the shaft 14 and with the inner surface 75 of the cylindrical member 28 of the motor housing 12. The radially outer ends of the vanes 88, 90 and 92 are however not in bearing contact with the radially inner surface of the cylindrical member 28. Relatively light sealing members 110, 112 and 114 are however provided in the ends of the vanes 88, 90 and 92, respectively, to provide a seal between the vanes and the cylindrical member 28.

The rotor means 18 includes the rotor members 116, 118 and 120 positioned between the vanes 88, 90 and 92, as illustrated best in FIGURE 2. The rotor members are secured to collar 42 by convenient means, such as bolts 122 as illustrated in FIGURE 1. Rotor members 116, 118 and 120 further include a common annular flange 124 which performs a function similar to the collar 42 in securing the rotor members together and rotatably mounting the rotor members in the bearing 126 which is similar in function to the bearing 40. Thus it will be particularly noted that the rotor means 18 is eccentrically mounted with respect to the shaft 14 and the inner surface 75 of the cylindrical member 28.

The members 128 which extend the full length of the cylindrical member 28 are secured to each of the vanes 88, 90 and 92 on both sides thereof and include a flat surface 130 slidable radially of the vanes and an arcuate surface 132 on which the individual rotor members 116, 118 and 120 are pivotally mounted. The members 128 thus provide a seal for individual combustion chambers 134, 136 and 138.

Sealing of one side of the separate combustion chambers 134, 136 and 138 is accomplished by means of the annular sealing ring 140 secured to each of the individual rotor members by convenient means, such as dowels 142 and urged against the end plate 24 by angularly spaced resilient means 144 in conjunction with the mating arcuate grooves 146 in the individual rotor members and arcuate tongues 148 in the sealing ring 140. The other side of the individual combustion chambers is sealed by means of the annular valve plate 20 in conjunction with the end plate 26 and the rotor means 18.

The valve plate 20 is rotated at a different speed from the speed of shaft 14 and rotor means 18 by means of the gear 150 secured to the shaft 14 for rotation therewith by means of the key 152 in mesh with the ring gear 154 eccentrically mounted with respect to the shaft 14, as shown best in FIGURE 4. The ring gear 154 is secured to the valve plate adapter 58 by convenient means, such as key 156 for rotation therewith. Similarly the valve plate 20 is keyed to the valve plate adapter 58 by convenient means, such as keys 158, illustrated best in FIGURE 1. Thus a complete rotation of shaft 14 will produce less than a complete rotation of ring gear 154 and therefore less than a complete rotation of the valve plate 20.

In the embodiment shown in the drawings the diameters of the gears 150 and 154 are so chosen that for every complete revolution of the valve plate the rotor means 118 and shaft 114 will complete one and one-third revolutions. Thus with three equally spaced openings 160, 162 and 164 in the rotor means spaced at equal angular distances from each other so that one opening is in each of the individual combustion chambers 134, 136 and 138 and with openings 166, 168, 170 and 172 in valve plate 20 positioned as indicated in FIGURE 3 in pairs one hundred eighty degrees from each other, proper valving will be provided for one explosion in each of the three combustion chambers, for two complete rotations of the rotor means 18.

That is to say, considering the operation of the engine 10, and assuming the opening 160 is centrally located in the rotor member 118 and positioned as shown in FIGURE 4, on the first half revolution of the valve plate 20 in a counterclockwise direction the opening 160 will register with the opening 166 and the passages 52 and 48 to the fuel intake of the engine. In the counterclockwise rotation of the opening 160 and therefore of rotor means 18 and vane means 16 the chamber 136 is constantly enlarging as will be obvious when considering the volume of combustion chamber 138, as indicated in FIGURE 2, fuel is therefore drawn into the combustion chamber 136 by a vacuum created therein.

During the next half revolution of the opening 160 in a counterclockwise direction the opening has passed over the opening 166 whereby the combustion chamber 136 is sealed as it returns again to the position shown in FIGURE 4. During this upward movement of the opening 160 the chamber 136 has been reduced in volume from a maximum greater than the volume of the chamber 134, indicated in FIGURE 2, to the volume of the chamber 136, as indicated in FIGURE 2. The fuel therein has thus been compressed.

The fuel is then ignited as by means of the spark plug 174 by usual engine timing apparatus (not shown). The timing apparatus may be for example a cam driven by the shaft 14 operable to connect and disconnect the spark plug 174 to a source of electrical energy at predetermined times in the rotation of shaft 14. On firing of the spark plug 174 the opening 160 is again moved counterclockwise a half revolution under the influence of the expanding ignited fuel moving the chamber 136 toward a maximum volume thereof.

During the following half rotation of valve disc 20 the opening 160 passes over the opening 170 in alignment with the exhaust passages 174 and 46 back into the position illustrated in FIGURE 4 to complete a cycle of operation of the engine 10.

Each of the openings 160, 162 and 164 go through a similar cycle of operation during each two complete revolutions of the shaft 14, vane means 16 and rotor means 18, as will be understood on consideration of the movement of the openings 162 and 164 with respect to the openings 166, 168, 170 and 172 in conjunction with the intake passages 52 and 48 and the exhaust passages 20 and 50, as explained in consideration of the rotation of opening 160. Thus it will be readily apparent that with the particular embodiment of the invention illustrated that three fuel explosions are provided to drive the shaft 14 during each two complete revolutions of the shaft 14.

In considering the over-all operation of the motor it will be assumed that the shaft 14, the vane means 16 and rotor means 18 are rotating in a counterclockwise direction and that fuel has been compressed in the combustion chamber 136, illustrated in FIGURE 2, which is defined by the rotor member 118, members 128 at each end of the combustion chamber, the outer ends of the vanes 90 and 92 and the seals 112 and 114 therein, and the sealing ring 140 and valve plate 20 in conjunction with end plates 24 and 26 and cylindrical member 28 of the motor housing. Spark plug 174 is then caused to fire by convenient timing means which as previously indicated may be entirely conventional and therefore is not shown.

On firing of the spark plug 174 the compressed fuel in combustion chamber 136 is caused to explode whereby the expanding gases seek a greater volume in which to expand which may be obtained on continued rotation of the vane means 16 and rotor means 18 in a counterclockwise direction in the stationary housing 12. The expanding gases thus drive the vane 92 which drives shaft 14 and the rotor means 116 and therefore the entire vane means in a counterclockwise direction. Similarly on a properly timed explosion occurring in chamber 134 or 138 the entire vane means is driven through engagement of the individual vanes 88, 90 and 92 and the rotor members 116, 118 and 120.

The driving of the rotor means 18 and vane means 16 is accomplished due to the eccentric mounting of the rotor means 116 within the cylindrical member 28 of the housing 12 so that as the vane means 16 and rotor means 18 are rotated from the position shown in FIGURE 2 the volume of the combustion chamber 136 increases to a maximum when the rotor means 16 has completed a half revolution. The expanding gases in the chamber 136 in the position illustrated in FIGURE 2 will therefore drive the rotor means 18, vane means 16 and shaft 14 in a direction to provide more volume for expansion of gases caused thereby which if the motor has momentum in a counterclockwise direction or if the fuel is ignited when the chamber 136 is in a slightly counterclockwise position from that shown in FIGURE 2 will be counterclockwise.

The exact time of firing of the spark plug 174 and the exact time of registering the openings in the rotor means 116, valve plate 20 and housing 12 may of course be varied to produce optimum engine operation.

Shaft 14 is therefore driven during the first half rotation of rotor means 18 after the fuel is ignited in the chamber 136. During the next three half rotations of rotor means 18 the expanded fuel will be exhausted from the chamber 136, fuel will be drawn into chamber 36 and compress therein respectively, as indicated in the consideration of the valve plate operation.

The cycle of chambers 134 and 138 is similar to that of chamber 136 except the cycles of the other chambers are time displaced by two hundred forty degrees of rotation. Each separate combustion chamber completes a cycle of operation during four half rotations of rotor means 18 or two revolutions of the shaft 14.

Thus it will be seen that the rotary engine of the invention is simple and compact. Further it will be particularly noted that all rotating masses in the engine of the invention, both concentric and eccentric to the stationary housing cylinder, and including the sealing means are substantially in centrifugal balance.

The drawings and the foregoing specification constitute a description of the improved rotary engine in such full, clear, concise and exact terms as to enable any person skilled in the art to practice the invention, the scope of which is indicated by the appended claims.

What I claim as my invention is:

1. A rotary engine comprising a cylindrical housing, a shaft rotatably mounted in said housing and coaxial therewith, radially extending vane means concentric with said cylindrical housing secured to and spaced angularly about said shaft, rotor means mounted within said cylindrical housing between the vane means and cylindrical housing for eccentric rotation with respect to the shaft and cylindrical housing, sealing means operably associated with the vane means, rotor means and housing and positioned between the vane means and motor means and the housing for providing separate combustion chambers around the periphery of said rotor means defined by the sealing means, vane means, rotor means and housing, means for sequentially drawing fuel into the separate combustion chambers, compressing the fuel, igniting the compressed fuel and exhausting the combustion gases from the separate chambers during rotation of the shaft, vane means and rotor means to sustain rotation thereof, including inlet and exhaust passages within said housing, separate passages in said rotor between the exterior thereof and each of said combustion chambers, and a rotatable valve plate positioned between said housing and rotor means at one end of the cylindrical housing including a plurality of openings therethrough for sequentially connecting each of the rotor passages with the inlet and exhaust passages on relative rotation of the rotor means and valve plate and means for rotating said valve plate at a speed different than the speed of rotation of said rotor means.

2. Structure as set forth in claim 1 wherein the sealing means includes a sealing ring positioned between the rotor means and housing at the other end of the cylindrical housing, circumferentially extending tongue and groove means acting between the sealing ring and rotor means and resilient means acting between the sealing ring and rotor for urging the rotor into engagement with the valve plate and the sealing ring into engagement with said other end of the cylindrical housing.

3. Structure as set forth in claim 1 wherein the means for rotating the valve plate at a speed different from the speed of rotation of the rotor means comprises a drive gear secured to the shaft, a valve plate adapter sleeve, sleeved over said shaft and mounted in the housing for rotation coaxially with the rotor and in driving engagement with the valve plate, and a ring gear having an internal diameter greater than the external diameter of the drive gear internally meshed with a portion of the drive gear and secured to the valve plate adapter sleeve in driving relation thereto.

4. Structure as set forth in claim 3 wherein the air intake and exhaust passages extend circumferentially of the valve plate at said one end of the housing and on opposite sides thereof for approximately one hundred twenty degrees and are open toward the valve plate, the valve plate is provided with two pairs of openings therethrough radially aligned and spaced one hundred eighty degrees apart circumferentially, each pair of which is separated circumferentially by a distance substantially equal to the circumferential extent of the openings and both pairs of which are in radial alignment with the intake and exhaust passages, three separate combustion chambers are provided with the openings extending through said rotor thereinto terminating exteriorly of the rotor in radial alignment with the openings in the valve plate and spaced one hundred twenty degrees apart circumferentially of the rotor and the means for rotating said valve plate at a speed different from the speed of rotation of said rotor means is operable to rotate the valve plate three revolutions for every four revolutions of the rotor.

References Cited in the file of this patent

UNITED STATES PATENTS

| | | |
|---|---|---|
| 846,844 | Green | Mar. 12, 1907 |
| 1,255,403 | Gardiner et al. | Feb. 5, 1918 |
| 2,071,799 | Mabille | Feb. 23, 1937 |

FOREIGN PATENTS

| | | |
|---|---|---|
| 420,127 | Italy | Apr. 16, 1947 |